US009557409B2

(12) United States Patent
Ferguson

(10) Patent No.: US 9,557,409 B2
(45) Date of Patent: Jan. 31, 2017

(54) METHOD OF SYSTEM COMPENSATION TO REDUCE THE EFFECTS OF SELF INTERFERENCE IN FREQUENCY MODULATED CONTINUOUS WAVE ALTIMETER SYSTEMS

(71) Applicant: Honeywell International Inc., Morris Plains, NJ (US)

(72) Inventor: Paul David Ferguson, Redmond, WA (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/006,766

(22) Filed: Jan. 26, 2016

(65) Prior Publication Data
US 2016/0139256 A1 May 19, 2016

Related U.S. Application Data

(62) Division of application No. 13/559,834, filed on Jul. 27, 2012, now Pat. No. 9,297,885.

(51) Int. Cl.
G01S 7/03 (2006.01)
G01S 13/88 (2006.01)
(Continued)

(52) U.S. Cl.
CPC ............ *G01S 7/023* (2013.01); *G01S 7/038* (2013.01); *G01S 13/343* (2013.01); *G01S 13/882* (2013.01); *G01S 13/32* (2013.01)

(58) Field of Classification Search
CPC ........ G01S 7/023; G01S 13/882; G01S 7/038; G01S 13/343
See application file for complete search history.

(56) References Cited

U.S. PATENT DOCUMENTS 3,256,520 A 6/1966 Blitz
3,703,004 A 11/1972 Slater
(Continued)

FOREIGN PATENT DOCUMENTS

DE 19855367 6/2000
EP 0138253 A2 4/1985
(Continued)

OTHER PUBLICATIONS

European Patent Office, "Office Action from EP Application No. 13176560.4-1812,mailed Feb. 12, 2016", "From foreign counterpart of U.S. Appl. No. 15/006,766", Feb. 12, 2016, pp. 1-5, Published in: EP.

(Continued)

Primary Examiner — Matthew M Barker
(74) Attorney, Agent, or Firm — Fogg & Powers LLC

(57) ABSTRACT

An altimeter system is provided. The altimeter system includes a receiver mixer including an antenna-input and a local-oscillator-input; a transceiver circulator communicatively coupled to an antenna via a transmission line having a selected length and communicatively coupled to the antenna-input of the receiver mixer; and a transmitter configured to output a transmitter signal to the antenna via the transceiver circulator. The transmitter signal is frequency modulated with a linear ramp. The transmitter is communicatively coupled to the receiver mixer to input a local oscillator signal at the local-oscillator-input of the receiver mixer. The receiver mixer is communicatively coupled to input a target-reflected signal from the antenna at the antenna-input of the receiver mixer. The selected length of the transmission line is set so that a composite-leakage signal at the antenna-input of the receiver mixer has a linear phase across a sweep bandwidth.

4 Claims, 8 Drawing Sheets

(51) Int. Cl.
  *G01S 13/32* (2006.01)
  *G01S 7/02* (2006.01)
  *G01S 13/34* (2006.01)

(56) References Cited

U.S. PATENT DOCUMENTS

| | | | |
|---|---|---|---|
| 3,766,554 A * | 10/1973 | Tresselt | G01S 13/50 342/112 |
| 4,428,044 A | 1/1984 | Liron | |
| 4,577,163 A | 3/1986 | Culp | |
| 4,682,175 A | 7/1987 | Lazarus | |
| 4,725,842 A * | 2/1988 | Mayberry | G01S 7/038 342/198 |
| 4,825,214 A | 4/1989 | Dejaegher | |
| 4,945,360 A | 7/1990 | Trummer et al. | |
| 4,965,533 A | 10/1990 | Gilmore | |
| 4,968,967 A | 11/1990 | Stove | |
| 4,970,519 A | 11/1990 | Minnis | |
| 5,359,331 A | 10/1994 | Adler | |
| 5,757,239 A | 5/1998 | Gilmore | |
| 5,757,311 A | 5/1998 | Voyce | |
| 5,757,312 A | 5/1998 | Szmurlo et al. | |
| 5,880,786 A | 3/1999 | Oku et al. | |
| 5,920,572 A | 7/1999 | Washington et al. | |
| 5,969,667 A | 10/1999 | Farmer et al. | |
| 6,295,020 B1 | 9/2001 | Koechlin | |
| 6,384,770 B1 | 5/2002 | de Gouy et al. | |
| 6,486,826 B1 | 11/2002 | Cramer et al. | |
| 7,098,841 B2 | 8/2006 | Hager et al. | |
| 7,239,266 B2 | 7/2007 | Vacanti | |
| 7,463,710 B2 | 12/2008 | Walsh et al. | |
| 7,656,347 B2 | 2/2010 | Hong et al. | |
| 7,791,415 B2 | 9/2010 | Hornbuckle | |
| 8,085,097 B2 | 12/2011 | Cloutier et al. | |
| 8,463,201 B2 * | 6/2013 | Jung | H04B 1/525 455/114.2 |
| 8,638,139 B2 | 1/2014 | Keaveney et al. | |
| 8,917,204 B2 * | 12/2014 | Trotta | G01S 7/023 342/159 |
| 2006/0049977 A1 | 3/2006 | Vacanti | |
| 2008/0246649 A1 | 10/2008 | Backes et al. | |
| 2010/0225524 A1 | 9/2010 | Szajnowski | |
| 2010/0283665 A1 | 11/2010 | Bashir et al. | |
| 2011/0122017 A1 | 5/2011 | Vacanti | |
| 2011/0205105 A1 | 8/2011 | Reuter | |
| 2012/0112806 A1 | 5/2012 | Dayi | |
| 2012/0242383 A1 | 9/2012 | Elad et al. | |
| 2012/0281713 A1 | 11/2012 | Mangano et al. | |
| 2013/0214963 A1 | 8/2013 | Vacanti | |
| 2014/0070985 A1 | 3/2014 | Vacanti | |

FOREIGN PATENT DOCUMENTS

| | | |
|---|---|---|
| JP | 60008197 | 1/1985 |
| JP | 6120735 | 4/1994 |
| JP | 8097744 | 4/1996 |
| JP | 11148972 | 6/1999 |
| JP | 2002353709 | 12/2002 |
| JP | 2003018001 | 1/2003 |
| JP | 2005151444 | 6/2005 |
| JP | 2013200135 | 10/2013 |

OTHER PUBLICATIONS

European Patent Office, "European Search Report from EP Application No. 13155116.0 mailed Jun. 7, 2013", "from Foreign Counterpart of U.S. Appl. No. 13/662,755", Jun. 7, 2013, pp. 1-3, Published in: EP.

U.S. Patent and Trademark Office, "Notice of Allowance", "from U.S. Appl. No. 13/662,755", Jun. 27, 2014, pp. 1-31.

European Patent Office, "European Search Report from EP Application No. 13176560.4 mailed Nov. 18, 2014", "from Foreign Counterpart of U.S. Appl. No. 13/559,834", Nov. 18, 2014, pp. 1-5, Published in: EP.

European Patent Office, "European Office Action for Application Serial No. 13176560.4", "from Foreign Counterpart to U.S. Appl. No. 13/559,834", Jan. 26, 2015, pp. 1-12, Published in: EP.

European Patent Office, "Partial European Search Report", "from EP Counterpart to U.S. Appl. No. 13/559,834", Jul. 10, 2014, pp. 1-6, Published in: EP.

U.S. Patent and Trademark Office, "Advisory Action", "U.S. Appl. No. 13/559,834", Oct. 16, 2015, pp. 1-4.

U.S. Patent and Trademark Office, "Final Office Action", "U.S. Appl. No. 13/559,834", Jul. 28, 2015, pp. 1-10.

U.S. Patent and Trademark Office, "Notice of Allowance and Fee(s) Due", "U.S. Appl. No. 13/559,834", Nov. 25, 2015, pp. 1-8, Published in: US.

U.S. Patent and Trademark Office, "Office Action", "U.S. Appl. No. 13/559,834", Apr. 23, 2015, pp. 1-25.

U.S. Patent and Trademark Office, "Restriction Requirement from U.S. Appl. No. 13/559,834", "U.S. Appl. No. 13/559,834", Mar. 12, 2015, pp. 1-5, Published in: US.

Appel, "Fractional N Synthesizers", "RF Signal Processing", Nov. 2000, pp. 1-9.

Benard, "A High-Stability Low-Offset Phase-Locked-Loop Frequency Synthesizer", "IEEE Transactions on Instrumentation and Measurement", Sep. 1975, pp. 222-224, vol. IM-24, No. 3.

Bisanti et al., "Fully integrated Sigma-Delta Synthesizer Suitable for 'Indirect VCO modulation' in 2.5G application", "2003 IEEE Radio Frequency Integrated Circuits Symposium", as early as Dec. 2003, pp. 515-518.

Caglio et al., "An Integrated GaAs 1.25 GHz Clock Frequency FM-CW Direct Digital Synthesizer", Oct. 1993, pp. 167-170.

Jeong et al., "A Multi-Beam and Multi-Range Radar with FMCW and Digital Beam Forming for Automotive Applications", "Progress in Electromagnetics Research", Nov. 2011, pp. 285-299, vol. 124.

Nash, "Phase-Locked Loop Design Fundamentals", Feb. 2006, pp. 1-22, Publisher: Freescale Semiconductor.

Pazarci, "Phase-Lock Systems (ELE608E-01)", Jan. 27, 2009, pp. 1-2.

Saul, "Direct Frequency Synthesis: A Review of the Technique and Potential", Jul. 1990, pp. 5-9, Publisher: Plessey Research Caswell, U.K.

"Fractional/Integer-N PLL Basics", Aug. 1999, pp. 1-55, Publisher: Texas Instruments.

State Intellectual Property Office, P.R. China, "Office Action, from CN Application No. 201310476753.5, mailed Sep. 18, 2016", "from Foreign Counterpart U.S. Appl. No. 15/006,766", Sep. 18, 2016, pp. 1-15.

* cited by examiner

METHOD OF SYSTEM COMPENSATION TO REDUCE THE EFFECTS OF SELF INTERFERENCE IN FREQUENCY MODULATED CONTINUOUS WAVE ALTIMETER SYSTEMS

CROSS-REFERENCE TO RELATED APPLICATION

This application is a divisional of pending U.S. application Ser. No. 13/559,834, entitled METHOD OF SYSTEM COMPENSATION TO REDUCE THE EFFECTS OF SELF INTERFERENCE IN FREQUENCY MODULATED CONTINUOUS WAVE ALTIMETER SYSTEMS filed on Jul. 27, 2012, the disclosure of which is incorporated herein by reference.

BACKGROUND

Radio altimeters for aircraft are required to measure altitudes (range) from over 6000 feet to less than 4 feet. Single antenna frequency modulated continuous wave (FMCW) altimeter systems have short range limitations due to short path transceiver leakage through various paths that create self-interference. A short path transceiver leakage signal is primarily the result of combining a leakage signal due to the finite directivity of a transceiver circulator and reflections of the transmitter signal from (off of) the antenna into the receiver. The leakage signal due to the finite directivity of the transceiver circulator is referred to herein as a "circulator-leakage signal". The reflection of the transmitter signal from the antenna into the receiver is referred to herein as an "antenna-reflection-leakage signal".

The superposition of the circulator-leakage signal and the antenna-reflection-leakage signal at the receiver generates a self-interference, which can mask actual short range target returns. The circulator-leakage signal and the antenna-reflection-leakage signal typically have slightly different time delays through their different leakage paths. When the circulator-leakage signal and the antenna-reflection-leakage signal coherently recombine at the receiver mixer, they form a composite-leakage signal that has the same frequency but varies in phase and amplitude versus frequency. The composite-leakage signal is converted in the receiver mixer to a very low frequency difference signal resulting from the detection of both the phase modulation and amplitude modulation of the composite-leakage signal. If the target range is small, for example, 3 to 4 feet, the intermediate frequency (IF) of the target reflection signal is slightly higher than the IF of the composite-leakage signal and the altimeter system does not have sufficient frequency resolution to separate them into separate signals. The receiver mixer output signal is distorted resulting in range errors, missed detections, or grossly false range determinations.

Thus, the self-interference from the short path transceiver leakage signal is a significant limiting factor for ultra-short range performance.

SUMMARY

The embodiments of the present invention provide methods and systems for altimeter systems and will be understood by reading and studying the following specification.

The present application relates to an altimeter system. The altimeter system includes a receiver mixer including an antenna-input and a local-oscillator-input; a transceiver circulator communicatively coupled to an antenna via a transmission line having a selected length and communicatively coupled to the antenna-input of the receiver mixer; and a transmitter configured to output a transmitter signal to the antenna via the transceiver circulator. The transmitter signal is frequency modulated with a linear ramp. The transmitter is communicatively coupled to the receiver mixer to input a local oscillator signal at the local-oscillator-input of the receiver mixer. The receiver mixer is communicatively coupled to input a target-reflected signal from the antenna at the antenna-input of the receiver mixer. The target-reflected signal is reflected from a target to the antenna. The selected length of the transmission line is set so that a composite-leakage signal at the antenna-input of the receiver mixer has a linear phase across a sweep bandwidth.

DRAWINGS

Like reference numbers and designations in the various drawings indicate like elements.

DETAILED DESCRIPTION

The single antenna FMCW altimeter systems and method of operation described herein minimize the effect of self-interference from the short path transceiver leakage signal so the altimeter system accurately detects ranges (distance to targets) of less than 4 feet. FMCW systems are homodyne systems in which the local oscillator (LO) signal to a receiver mixer is derived directly from a transmitter signal. In some cases, the LO signal is a sample of the transmitter signal coupled (fed) directly from the transmitter output to the LO input of the mixer. The phrases "altimeter", "radar altimeter", and "radio altimeter" are used interchangeably herein.

Figure 1A:
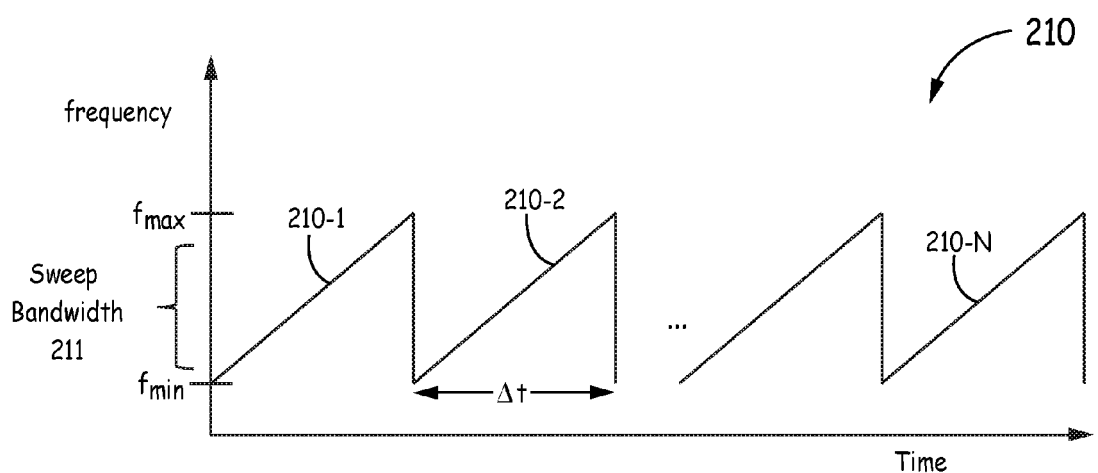
FIG. 1A shows an exemplary frequency modulated continuous wave (FMCW) transmitter signal linearly ramped in frequency versus time.

FIG. 1A shows an exemplary frequency modulated continuous wave (FMCW) transmitter signal 210 linearly ramped in frequency versus time. During FMCW operation of a radar or radio altimeter, the transmitter signal 210 is repetitively frequency modulated with a linear ramp (i.e., repetitive frequency sweeps at a constant rate versus time in either a positive or negative direction). Each of the repetitive frequency sweeps is a frequency chirp. The exemplary ramped segments of FIG. 1A, which are represented generally at 210(1-N), where N is a positive integer, range in frequency from $f_{min}$ to $f_{max}$ and are swept in a positive direction. A portion of the frequencies within a range of frequencies from $f_{min}$ to $f_{max}$ is referred to herein as the sweep bandwidth 211. As defined herein, term "sweep bandwidth 211" is the "useable bandwidth" that is usable by the radar altimeter. The sweep bandwidth 211 is also referred to herein as an "operating bandwidth of an altimeter system".

The useable bandwidth is generally somewhat smaller than the "total frequency sweep", which is shown in FIG. 1A as "$f_{max}-f_{min}$". A typical range of the sweep bandwidth 211 is equal to or greater than $f_{min}+[0.1(f_{max}-f_{min})]$ to $f_{max}-[0.1(f_{max}-f_{min})]$ or ≥80% or more of the total sweep bandwidth ($f_{max}-f_{min}$). The useable bandwidth is somewhat dependent on the maximum target range requirement since the LO signal and target return signals have minimum sweep overlap at the maximum range. In one implementation of this embodiment, the useable bandwidth is between 80-85% of the total sweep bandwidth. In another implementation of this embodiment, the useable bandwidth is 85% of the total sweep bandwidth. In yet another implementation of this embodiment, the useable bandwidth is about 90% of the total sweep bandwidth.

The transmitter signal 210 sweeps from $f_{min}$ to $f_{max}$ over a time Δt. This sweep is repeated during FMCW operation of the altimeter so that the transmitter signal 210 has a saw-tooth pattern as shown in FIG. 1A. In one implementation of this embodiment, the sweep of the transmitter signal 210 has a triangle pattern.

Figure 1B:
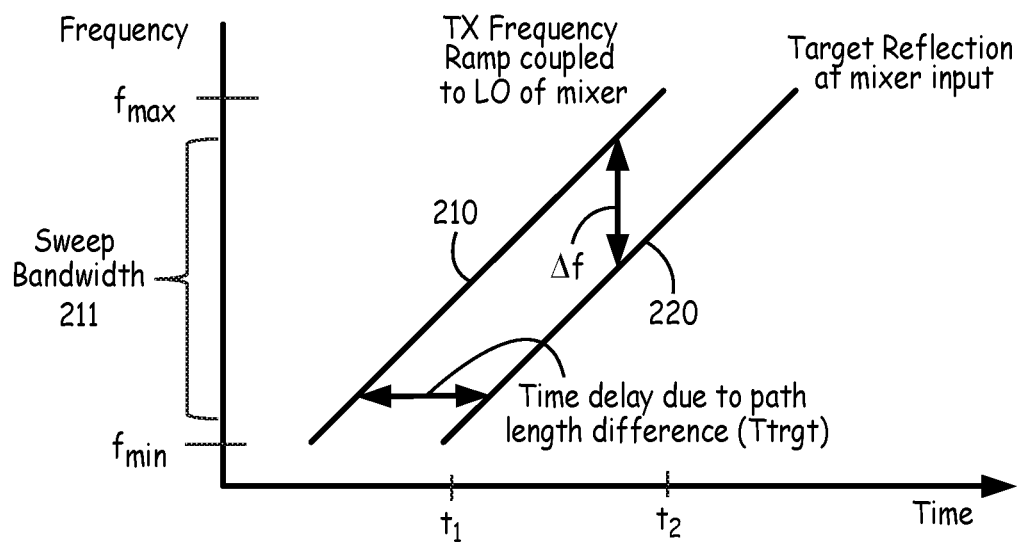
FIG. 1B shows a ramped segment of the exemplary FMCW transmitter signal of FIG. 1A and an exemplary target-reflected signal.
Figure 2:
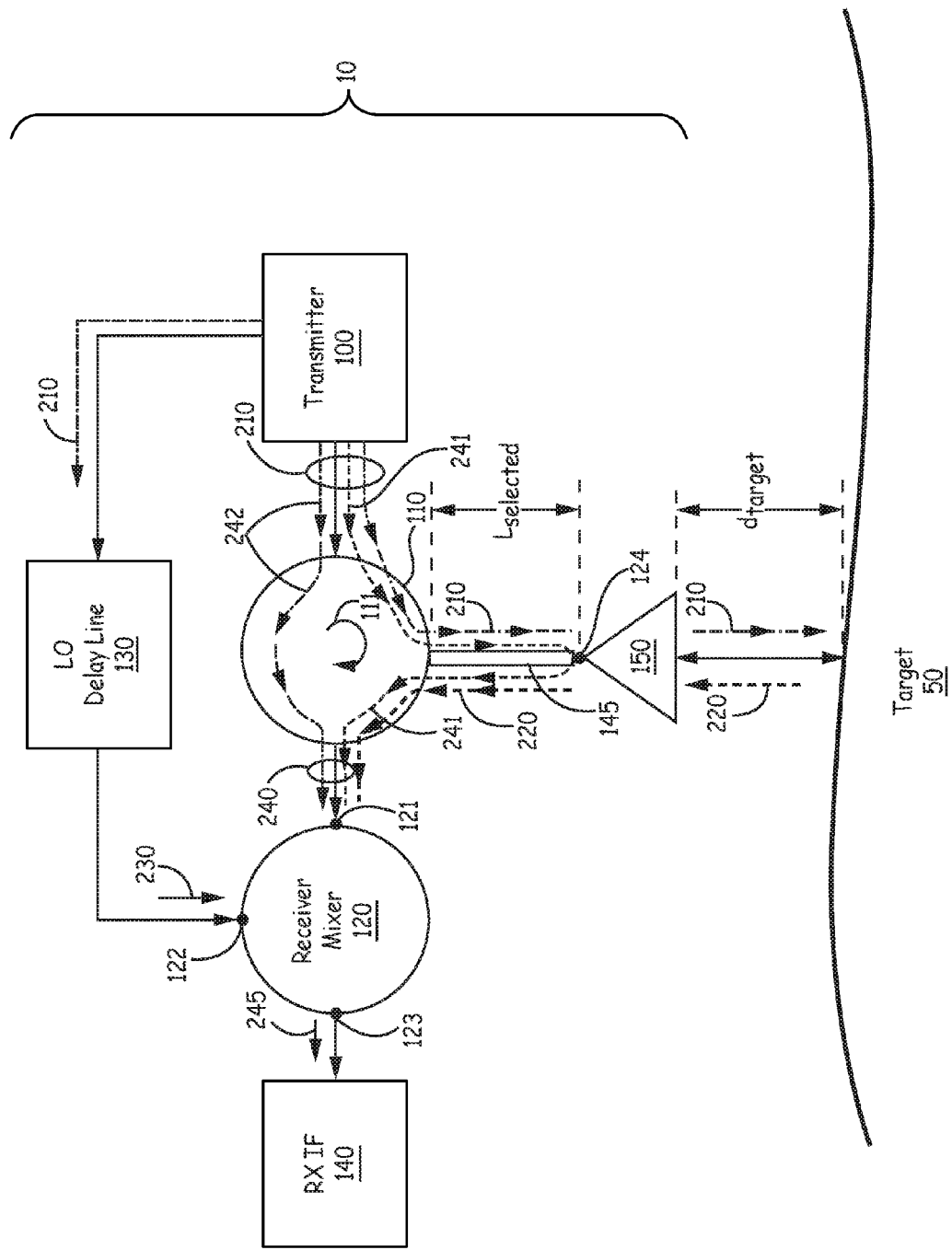
FIG. 2 is a block diagram of one embodiment of an altimeter system in accordance with the present invention.

FIG. 1B shows a ramped segment of the exemplary FMCW transmitter signal 210 of FIG. 1A and an exemplary target-reflected signal 220. FIG. 2 is a block diagram of one embodiment of an altimeter system 10 in accordance with the present invention. The altimeter system 10 includes a transmitter 100, a transceiver circulator 110, a receiver mixer 120, a local oscillator (LO) delay line 130, a receiver intermediate frequency (IF) module 140, a transmission line 145, and an antenna 150. The receiver mixer 120 includes an antenna-input 121 and a local-oscillator-input 122. The transceiver circulator 110 has a directivity represented generally at 111. The transceiver circulator 110 is communicatively coupled to the antenna 150 via the transmission line 145 that has a selected length $L_{selected}$.

The transmitter signal 210 is generated at the transmitter 100. The transmitter signal 210 is directed to the antenna 150 by the transceiver circulator 110. The transmitter signal 210 is emitted by the antenna 150 and propagates from the antenna 150 to a target 50. At least a portion, of the transmitter signal 210 is reflected by the target 50 as target-reflected signal 220 back to the antenna 150. The target-reflected signal 220 is received at the antenna 150 and propagates through the transceiver circulator 110 to the antenna-input 121 of receiver mixer 120. The transmitter signal 210 is also directed to the LO delay line 130. LO delay line 130 delays the received transmitter signal 210 and outputs the LO signal 230 to the local-oscillator-input 122 of the receiver mixer 120.

As shown in FIG. 1B, for the range of times between $t_1$ and $t_2$, the frequency of the target-reflected signal 220 input at the antenna-input 121 of the receiver mixer 120 differs from the frequency of the local oscillator signal 230 input at the local-oscillator-input 122 of the receiver mixer 120 by a constant amount (Δf). This frequency difference equals the amount of the frequency sweep that has occurred during the time required for the transmitter signal 210 to travel the distance from the transmitter to the target and back to the receiver minus the LO delay time. Thus, the distance $d_{target}$ to the target 50 from the antenna 150 is proportional to the difference frequency Δf. The output from IF-output 123 of the receiver mixer 120 is an intermediate frequency (IF) signal 245 that has a frequency equal to the frequency difference Δf. The receiver intermediate frequency (IF) module 140 processes the IF signals 245 to determine the distance $d_{target}$ to the target 50.

The transmitter signal 210 leaks into the receiver mixer 120 through leakage paths within the altimeter system 10. As shown in FIG. 2, the circulator-leakage signal 242 is the portion of the transmitter signal 210 that is backwards coupled in the transceiver circulator 110 (i.e., transmitted in the direction that is opposite the low-loss rotational direction 111 of the of the transceiver circulator 110). The low-loss rotational direction 111 is also referred to herein as "directivity 111". The antenna-reflection-leakage signal 241 is the portion of the transmitter signal 210 that is reflected from the antenna 150 (at the interface 124 between the antenna 150 and the transmission line 145) into the receiver mixer 120. The circulator-leakage signal 242 and the antenna-reflection-leakage signal 241 are superimposed at the antenna-input 121 of the receiver mixer 120 as the composite-leakage signal 240. Thus, the composite-leakage signal 240 is a coherent superposition of the antenna-reflection-leakage signal 241 and the circulator-leakage signal 242 at the antenna input 121 of the receiver mixer 120.

The altimeter system 10 is designed to control the output of the receiver mixer 120 to avoid self-interference due to phase and/or amplitude detection of the composite leakage signal 240. In order to obtain accurate ultra-short range (1-4 feet) performance, the receiver mixer output signal must have little or no alternating current (AC) content, due to internal leakage, that could interfere with the very low frequency IF signals produced by an ultra-short range target reflection. Specifically, the phase of the transmitter output across the sweep bandwidth 211 is linear, the phase of the composite-leakage signal 240 at the antenna-input 121 of the receiver mixer 120 is linear across the sweep bandwidth, and the phase of the LO signal 230 at the local-oscillator-input 122 of the receiver mixer 120 maintains a quadrature relationship (90° or 270°) to the phase of the composite-leakage signal 240. By maintaining a quadrature phase relationship between the LO signal 230 and the composite-leakage signal 240, the energy in the composite-leakage signal 240 is converted to a zero volt IF signal 245 by the phase detector properties of the receiver mixer 120. Thus, the altimeter system 10 is able to determine an ultra-short distance to a target 50 that is less than 4 feet from the altimeter system 10.

To ensure the phase of the composite-leakage signal 240 at the antenna-input 121 of the receiver mixer 120 is linear across the sweep bandwidth 211, the composite-leakage signal 240 is compensated very precisely so that both phase modulation (PM) and amplitude modulation (AM) detection is nulled at the output 123 of the receiver mixer 120.

Figure 3:
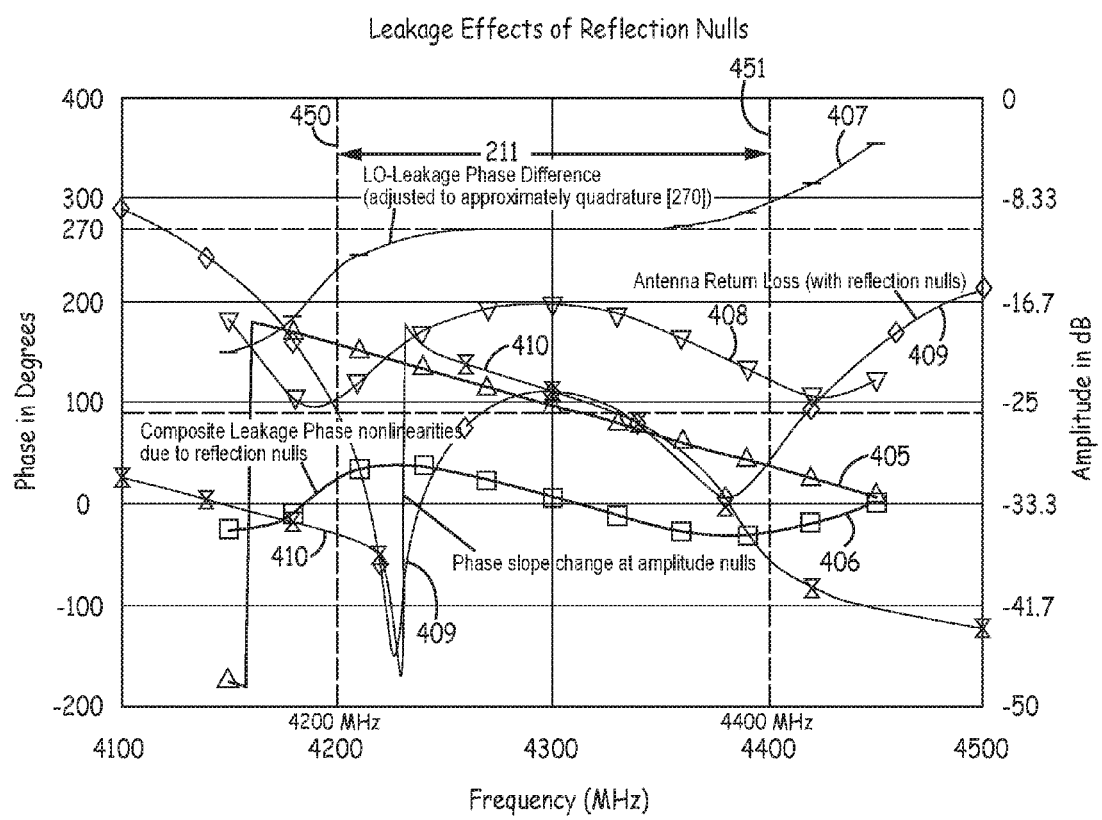
FIG. 3 shows various phase and amplitude responses of an embodiment of a prior art altimeter system exhibiting strong non-linear phase due to antenna-return-loss amplitude nulls.

FIG. 3 shows various phase and amplitude responses of an embodiment of a prior art altimeter system exhibiting strong non-linear phase due to antenna-return-loss amplitude nulls. As defined herein, a phase response is the phase angle of a signal versus frequency. As defined herein, an amplitude response is the amplitude of a signal versus frequency. As defined herein, an "antenna-return-loss amplitude null" (also referred to herein as an "amplitude null in the antenna return signal") is a local minimum in the amplitude response of the antenna-reflected signal received from the antenna at the antenna-input of the receiver mixer. As the frequency repeatedly chirps across the sweep-frequency range (i.e., the sweep bandwidth), any antenna-return-loss amplitude nulls in the sweep-frequency range are repeated with every frequency chirp. As shown in FIG. 3, the sweep bandwidth 211 is between the dashed vertical lines 450 and 451. As shown in FIG. 3, the exemplary sweep-frequency range extends from 4200 MHz to 4400 MHz, but other ranges are possible.

Plot 409 is the amplitude response of the antenna-return signal reflected from the antenna in a prior art altimeter system. The antenna-return-loss amplitude nulls are shown in plot 409 to be around 4220 MHz and 4380 MHz. Antenna-return-loss amplitude nulls are the result of tuning the antenna impedance match for maximum power transfer into the antenna. Nulls in the amplitude response also are indicative of phase non-linearities in the phase response plot 410. As a result, the composite-leakage-amplitude plot 408 and phase plot 406 also contain nulls and non-linearities respectively.

The phase angle in degrees versus frequency (phase response) of an antenna return signal input at the antenna-input of the transceiver circulator 110 is shown in plot 410. Plot 410 has large phase non-linearities at about 4220 MHz and 4380 MHz corresponding to the antenna-return-loss amplitude nulls at about 4220 MHz and 4380 MHz.

The phase angle in degrees versus frequency (phase response) of a local oscillator signal input at the local-oscillator-input the receiver mixer is plot 405. Since the LO path between the transmitter and the receiver mixer includes a power coupling circuit and a transmission line delay line, the phase response at the local-oscillator-input is linear versus frequency. The phase angle in degrees versus frequency (phase response) of a composite-leakage signal input at the antenna-input of the receiver mixer 120 is shown in plot 406. The composite-leakage signal phase response also exhibits phase non-linearities at about 4220 MHz and at about 4380 MHz.

The difference in phase angle between the phase response of the LO signal (plot 405) and the phase response of the composite-leakage signal (plot 406) is shown as plot 407. The adjustment for quadrature is done by an adjusting the delay line length until plot 407 lies most closely along the 270 degree or the 90 degree phase angle line. As shown in FIG. 3, plot 407 bends away from the 270 degree phase line around 4220 MHz and 4380 MHz due to the composite leakage phase non-linearities, which are due to the antenna-return-loss phase non-linearities around 4220 MHz and 4380 MHz.

Figure 4:
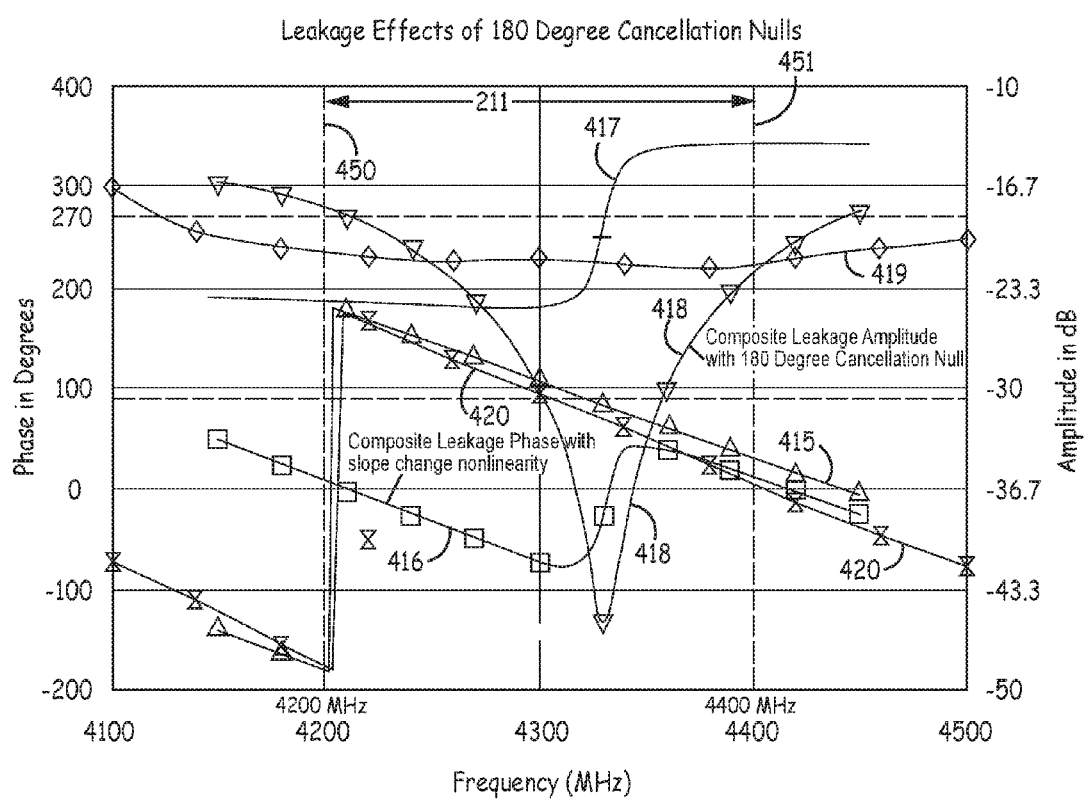
FIG. 4 shows various phase and amplitude responses of an embodiment of a prior art altimeter system exhibiting non-linear phase due to composite-leakage-amplitude nulls.

FIG. 4 shows various phase and amplitude responses of an embodiment of a prior art altimeter system exhibiting non-linear phase due to composite-leakage-amplitude nulls. As shown in FIG. 4, a composite-leakage-amplitude null, which is due to the coherent subtraction of two leakage signals of similar amplitude but 180° phase difference, is exhibited within the sweep bandwidth 211. The amplitude response of the composite-leakage signal is shown in plot 418. Plot 418 shows a composite-leakage-amplitude null at approximately 4327 MHz. As defined herein a "composite-leakage-amplitude null" is a local minimum in the amplitude response of the composite-leakage signal received at the antenna-input of the receiver mixer.

The composite-leakage-amplitude null is due to 180 degree cancellation caused by interference between leakage signals that form the composite-leakage signal. Specifically, the amplitude of the composite-leakage signal has a local minimum when the phase difference between the circulator-leakage signal and the antenna-reflection-leakage signal is 180 degrees at the antenna-input of the receiver mixer. When the phase difference between the circulator-leakage signal and the antenna-reflection-leakage signal at the antenna-input of the receiver mixer is 180 degrees, the circulator-leakage signal and the antenna-reflection-leakage signal coherently subtract and the amplitude of the composite-leakage signal is nulled (goes to zero).

Plot 419 is the amplitude response of the antenna-reflection leakage. As shown in FIG. 4, plot 419 does not have any significant antenna-return-loss amplitude nulls. Thus, FIG. 4 only shows the deleterious effect of composite-leakage-amplitude nulls due to coherent subtraction. In FIG. 4, the sweep-frequency range is the same as shown in FIG. 3.

The phase angle in degrees versus frequency (phase response) of an antenna-reflection leakage signal input at the antenna-input of the receiver mixer is shown in plot 420, which is linear across the sweep-frequency range 211. The phase angle in degrees versus frequency (phase response) of a local oscillator signal input at the local-oscillator-input the receiver mixer is plot 415, which is linear across the sweep-frequency range 211.

The phase angle in degrees versus frequency (phase response) of a composite-leakage signal input at the antenna-input of the receiver mixer is shown in plot 416. Since the phase of the composite-leakage signal reverses (changes) its slope versus frequency near the composite-leakage-amplitude nulls, the plot 416 has a phase non-linearity around frequency 4327 MHz corresponding to the composite-leakage-amplitude null at about 4327 MHz in plot 418.

The difference in phase angle between the phase response of the LO signal (plot 415) and the phase response of the composite-leakage signal (plot 416) with an adjustment for quadrature (270°) is shown in plot 417. The adjustment for quadrature is done by an adjusting the delay line length until plot 417 lies most closely along the 270 degree (or 90 degree) degree phase angle line.

When the amplitude of the antenna-reflection-leakage signal is greater than about one tenth (1/10) the amplitude of the circulator-leakage signal, its contribution to the composite-leakage signal is sufficient to impart the non-linear phase characteristic onto the composite-leakage signal.

Thus, as illustrated in FIGS. 3 and 4, prior art single antenna FMCW radar systems have two types of problems to address to be able to accurately detect ranges (distance to targets) of less than 4 feet. In order for the composite-leakage signal 240 to be in quadrature with the LO signal 230 across the usable sweep-frequency range (frequency bandwidth 211), the phase characteristic of the composite-leakage signal 240 must also be linear versus frequency. As noted above, the composite-leakage signal 240 is comprised primarily of a combination of the circulator-leakage signal 242 and the antenna-reflection-leakage signal 241. These two signals combine coherently at the input to the mixer.

The phase versus frequency of the composite-leakage signal is highly influenced by two conditions: the antenna-reflection-leakage signal phase; and the phase difference between the circulator-leakage signal 242 and the antenna-reflection-leakage signal 241. In order to address the former condition, the input impedance of the antenna 150 is tuned so the reflected signal has no amplitude nulls, and therefore no associated phase non-linearities. The altimeter system and method of operating as described herein address the latter condition by use of the transmission line 145 that has a selected length $L_{selected}$.

The path length of the circulator leakage is generally not variable. A proper selection of the selected length $L_{selected}$ has the effect of shifting the composite-leakage-amplitude nulls either higher or lower in frequency and out of the frequency bandwidth 211. The selected length $L_{selected}$ is chosen such that any composite-leakage-amplitude null are outside the operating range and the phase response is essentially linear within the sweep range 211.

Since the receiver mixer acts as both a phase detector and an amplitude detector to the composite-leakage signal, there is only one condition that guarantees a DC voltage IF output of the receiver mixer such that internal leakage does not produce any AC voltages to interfere with detection of ultra-short range target return signals. If the composite-leakage signal 240 does not have a constant amplitude response as is always the case (see plot 508 in FIG. 5A), the phase relationship between LO signal 230 and composite-leakage signal 240 must be quadrature (90 degrees or 270 degrees) (see plot 507 in FIG. 5A) so that phase detection will produce 0 VDC at the receiver mixer IF output 246 for all amplitudes of composite-leakage. When the composite leakage phase response is linear, a length of transmission line (delay line) in the LO path is designed to produce the quadrature condition at the receiver mixer over the sweep range 211.

Figure 5A:
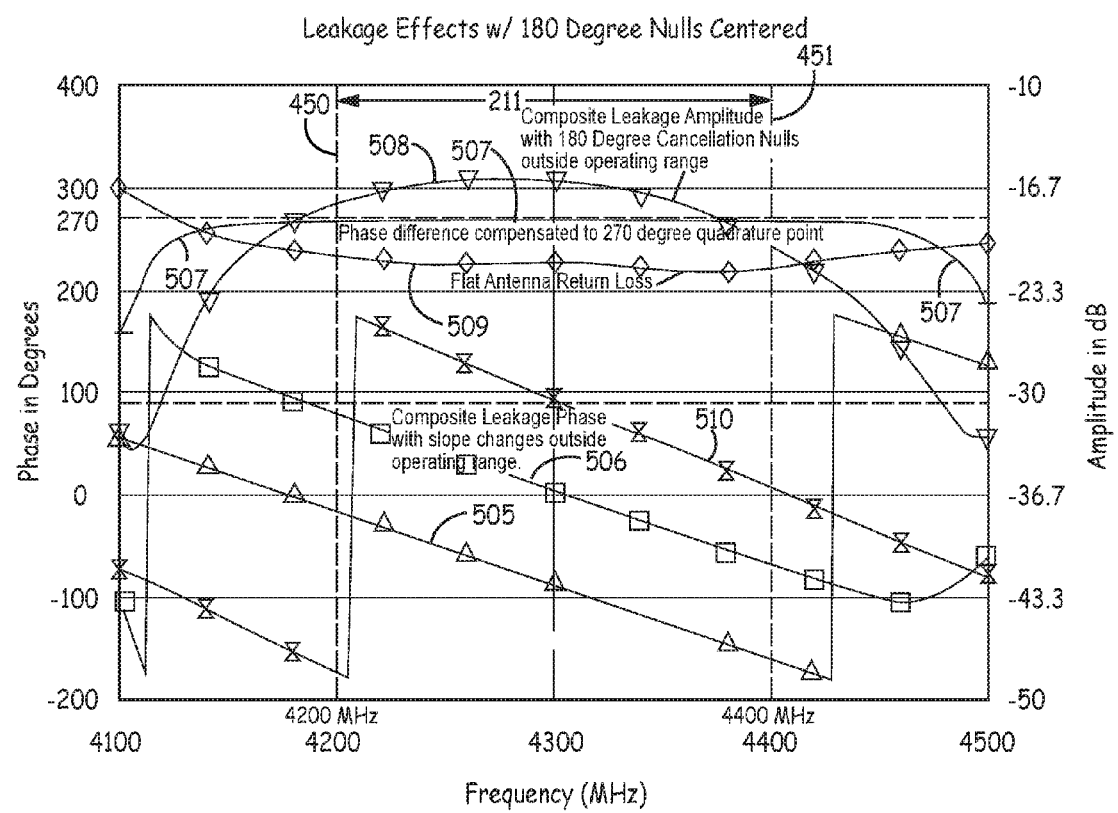
FIG. 5A shows various phase and amplitude responses of one embodiment of an altimeter system in accordance with the present invention.

FIG. 5A shows various phase and amplitude responses of an embodiment of an altimeter system 10 in accordance with the present invention. FIG. 5A shows an example of the phase response and amplitude response of the composite-leakage signal 240 for the altimeter system 10 in which the transmission line 145 has the selected length $L_{selected}$. For the altimeter system 10, the composite-leakage-amplitude nulls are shifted above and below the operating bandwidth 211 of the altimeter system 10 by a proper selection of the selected length $L_{selected}$. The selected length $L_{selected}$ is selected so the path, upon which the antenna-reflection-leakage signal 241 travels, properly centers the composite leakage response on the sweep range 211.

In FIG. 5A, the amplitude response of the composite-leakage signal is shown in plot 508. Plot 508 is smooth and has no nulls in the sweep range 211. Thus, there is no composite-leakage-amplitude null due to 180 degree interference between circulator-leakage signal 242 and the antenna-reflection-leakage signal 241 at the antenna-input 121 of the receiver mixer 120. Plot 509 is the amplitude response of the antenna-return signal reflected from the antenna, which is also relatively flat due to proper tuning of the antenna input impedance at the antenna input 124 (FIG. 2). Thus, plot 509 does not have any significant antenna-return-loss amplitude nulls.

The phase angle in degrees versus frequency (phase response) of an antenna return signal input at the antenna-input of the receiver mixer is shown in plot 510, which is linear across the sweep-frequency range 211. The phase angle in degrees versus frequency (phase response) of a local oscillator signal 230 input at the local-oscillator-input 122 of the receiver mixer 120 is plot 505, which is linear across the sweep-frequency range 211.

The phase angle in degrees versus frequency (phase response) of a composite-leakage signal input at the antenna-input of the receiver mixer is shown in plot 506. The plot 506 has a linear phase as indicated by the fact that the amplitude response of the composite-leakage signal 240 shown in plot 508 has no amplitude nulls inside the sweep-frequency range 211.

The difference in phase angle between the phase response of the LO signal (plot 505) and the phase response of the composite-leakage signal (plot 506) with an adjustment for quadrature (270°) is shown in plot 507. The adjustment for quadrature is done by an adjusting the length of the LO delay line 130 until plot 507 lies most closely along the 270 degree phase angle line. The difference in phase angle shown in plot 507 is flat across the complete sweep-frequency range 211 and lies precisely along the 270 phase angle line.

Figure 5B:
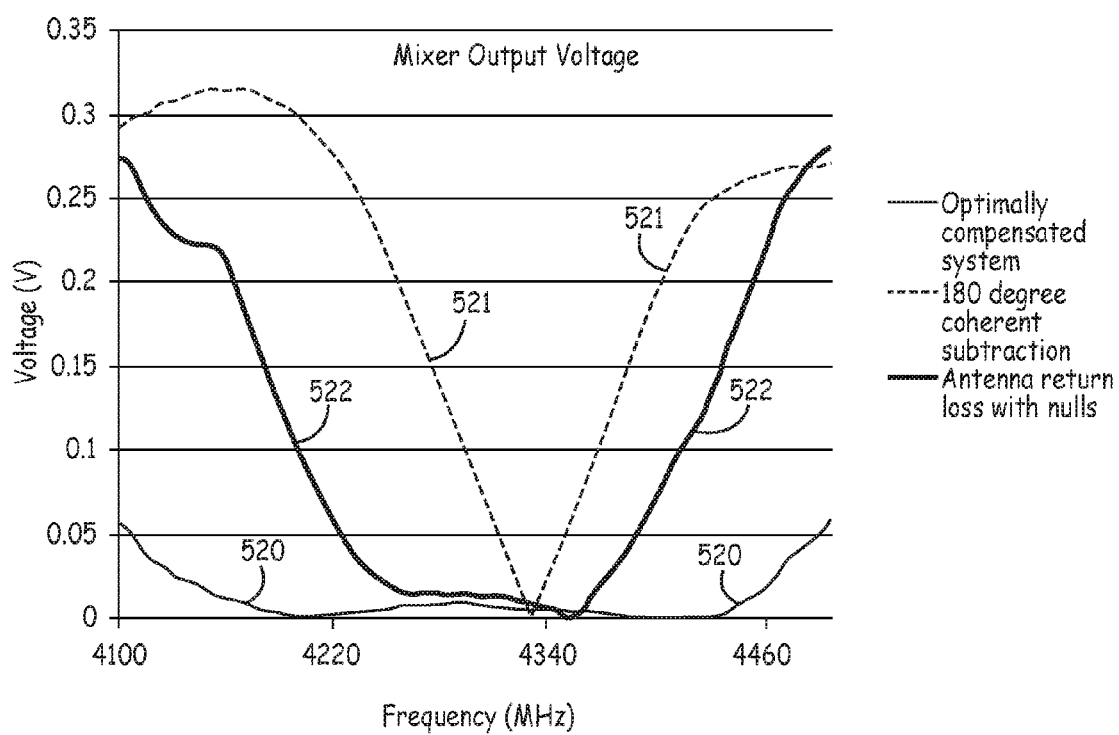
FIG. 5B shows an exemplary output voltage of the receiver mixer of FIG. 2, in accordance with the present invention, contrasted with output voltages of prior art receiver mixers.

FIG. 5B shows an exemplary output voltage of the receiver mixer 120 of FIG. 2, in accordance with the present invention, contrasted with output voltages of prior art receiver mixers. The predicted output voltage of the receiver mixer 120 of the altimeter system 10 of FIG. 2, which inputs fully compensated phase responses of FIG. 5A, is shown as plot 520. The predicted output voltage of a receiver mixer inputting the phase responses of FIG. 3 is shown as plot 522. The predicted output voltage of the receiver mixer inputting the phase responses of FIG. 4 is shown as plot 521. The output voltage 520 from the receiver mixer 120 is relatively flat compared to the predicted output voltage of a receiver mixers of the prior art receiver mixers. Specifically, the output voltage 520 is a DC voltage with very little AC voltage across the operating bandwidth of the altimeter system 10 compared to the voltages 521 and 522 output from uncompensated prior art systems.

The composite-leakage-amplitude nulls are corrected by setting the transmission line to the selected length $L_{selected}$ in order to ensure the two leakage signals have a near zero (0) degree phase difference throughout the sweep-frequency range. Specifically, referring to FIG. 2, the problem illustrated in FIG. 4 is corrected by setting the selected length $L_{selected}$ of the transmission line 145 so that the composite-leakage signal 240 at the antenna-input 121 of the receiver mixer 120 has a linear phase across the sweep bandwidth 211.

The altimeter system 10 of FIG. 2 ensures the amplitudes and the phase relationship between the composite-leakage signal 240 and LO signal 230 are constant across the sweep bandwidth 211 to produce a constant, or DC, detected output voltage (plot 520 as shown in FIG. 5B). The antenna 150 of the altimeter system 10 of FIG. 2 is designed with relatively constant return loss and linear return phase across the sweep-frequency range.

In summary, self-interference in a single antenna frequency modulated continuous wave (FMCW) altimeter system is reduced as follows. The phase of the composite-leakage signal 240 input to the antenna-input 121 of the receiver mixer 120 is controlled to be linear across a sweep bandwidth 211 by shifting composite-leakage-amplitude nulls outside the operating bandwidth 211 of the altimeter system 10. The selected length of the transmission line 145 is selected to ensure the composite-leakage signal 240 input to the antenna-input 121 of the receiver mixer 120 is linear across the sweep bandwidth 211. The input impedance of an antenna 150 is tuned to remove antenna-return-loss amplitude nulls from the operating bandwidth 211 of the altimeter system 10. Techniques to tune the input impedance of an antenna are known in the art.

Figure 6:
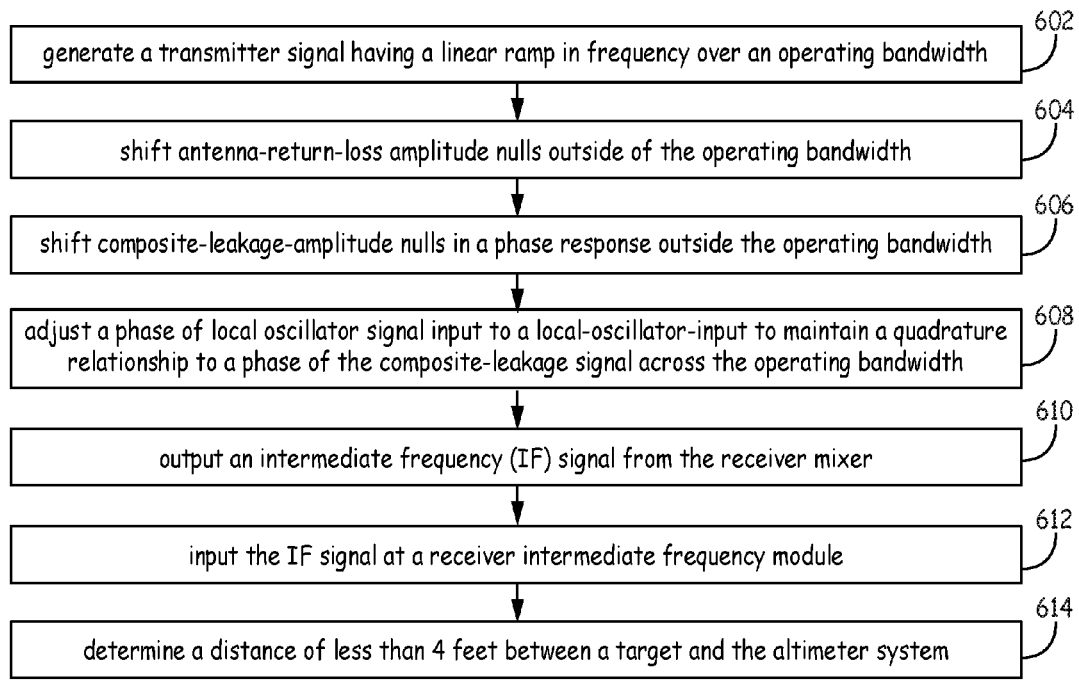
FIG. 6 is a flow diagram of one embodiment of a method to reduce self-interference in a single antenna frequency modulated continuous wave (FMCW) altimeter system in accordance with the present invention.

FIG. 6 is a flow diagram of one embodiment of a method 600 to reduce self-interference in a single antenna frequency modulated continuous wave (FMCW) altimeter system in accordance with the present invention. The method 600 is described with reference to the single antenna frequency modulated continuous wave (FMCW) altimeter system 10 of FIG. 2, but method 600 is applicable to other altimeter systems.

At block 602, a transmitter signal 210 having a linear ramp in frequency over the operating bandwidth 211 of the altimeter system 10 is generated at a transmitter 100.

At block 604, an input impedance of an antenna 150 is tuned to shift antenna-return-loss amplitude nulls and their associated phase non-linearities outside of the operating bandwidth 211 of the altimeter system 10. This tuning of the antenna impedance results in a linear phase response within the operating bandwidth 211.

At block 606, composite-leakage-amplitude nulls in a phase response of a composite-leakage signal and the associated phase non-linearities are shifted outside an operating bandwidth 211 of the altimeter system 10. The composite-leakage signal 240 is a coherent superposition of an antenna-reflection-leakage signal 241 and a circulator-leakage signal 242 at the antenna input 121 of the receiver mixer 120. A selected length $L_{selected}$ of the transmission line 145 is selected to ensure that any 180 degree phase difference between the antenna-reflection-leakage signal 241 and the circulator-leakage signal 242 occurs at frequencies outside of the sweep bandwidth 211. In this manner, a phase response of a composite-leakage signal 240 input to an antenna-input 121 of a receiver mixer 120 is controlled to be linear across a sweep bandwidth 210.

At block 608, a phase of a local oscillator signal 230 input to a local-oscillator-input 122 of the receiver mixer 122 is adjusted, by adjusting the phase length of the LO delay line 130, to maintain a quadrature relationship to a phase of the composite-leakage signal 240 input to an antenna-input 121 of the receiver mixer 122 across the operating bandwidth 211 of the altimeter system 10. Thus, the phase response of the local oscillator signal 230 input to a local-oscillator-input 122 is at 90 degrees or 270 degrees with respect to the phase response of the composite-leakage signal 240 input to the antenna-input 121.

At block 610, an intermediate frequency (IF) signal 245 is output from the receiver mixer 120. The IF signal 245 contains a DC voltage and little or no AC voltage and it does not interfere with low frequency signals from ultra-short range target reflections. At block 612, the IF signal 245 is input at a receiver intermediate frequency module 140. At block 614, the receiver intermediate frequency module 140 processes the input from the receiver mixer 120 to determine a distance of less than 4 feet between a target and the altimeter system based on the inputting of the IF signal. In this manner, an ultra-short distance to a target 50 from an altimeter system 10 is accurately determined.

EXAMPLE EMBODIMENTS

Example 1 includes an altimeter system, comprising a receiver mixer including an antenna-input and a local-oscillator-input; a transceiver circulator communicatively coupled to an antenna via a transmission line having a selected length and communicatively coupled to the antenna-input of the receiver mixer; and a transmitter configured to output a transmitter signal to the antenna via the transceiver circulator, wherein the transmitter signal is frequency modulated with a linear ramp, wherein the transmitter is communicatively coupled to the receiver mixer to input a local oscillator signal at the local-oscillator-input of the receiver mixer, wherein the receiver mixer is communicatively coupled to input a target-reflected signal from the antenna at the antenna-input of the receiver mixer, wherein the target-reflected signal is reflected from a target to the antenna, and wherein the selected length of the transmission line is set so that a composite-leakage signal at the antenna-input of the receiver mixer has a linear phase across a sweep bandwidth.

Example 2 includes the altimeter system of Example 1, wherein an antenna-reflection-leakage signal of the transmitter signal is reflected by the antenna to the antenna-input of the receiver mixer via the circulator, wherein a circulator-leakage signal of the transmitter signal is transmitted from the transmitter via the circulator to the antenna-input of the receiver mixer, wherein the antenna-reflection-leakage signal and the circulator-leakage signal are superimposed at the antenna input of the receiver mixer as the composite-leakage signal, and wherein, based on the selected length of the transmission line, 180 degree phase differences between the antenna-reflection-leakage signal and the circulator-leakage signal occur at frequencies outside of the sweep bandwidth.

Example 3 includes the altimeter system of any of Examples 1-2, wherein a phase of the local-oscillator signal received at the local-oscillator-input of the receiver mixer maintains a quadrature relationship to the phase of the composite-leakage signal.

Example 4 includes the altimeter system of any of Examples 1-3, further including a local oscillator delay line configured to input the transmitter signal from the transmitter and to output the local oscillator signal derived from the transmitter signal to the local-oscillator-input of the receiver mixer.

Example 5 includes the altimeter system of any of Examples 1-4, further including a local oscillator delay line configured to input the transmitter signal from the transmitter and to output the local oscillator signal derived from the transmitter signal to the local-oscillator-input of the receiver mixer.

Example 6 includes the altimeter system of any of Examples 1-5, further including the antenna configured to transmit the transmitter signal toward the target and configured to receive the target-reflected signal.

Example 7 includes the altimeter system of any of Examples 1-6, wherein the transmitter signal from the transmitter is output to the local-oscillator-input of the receiver mixer as the local oscillator signal.

Example 8 includes the altimeter system of any of Examples 1-7, further including a receiver intermediate frequency module communicatively coupled to input an intermediate frequency (IF) signal output from the receiver mixer.

Example 9 includes a method to reduce self-interference in a single antenna frequency modulated continuous wave (FMCW) altimeter system, the method including shifting composite-leakage-amplitude nulls outside an operating bandwidth of the altimeter system; and adjusting a phase of a local oscillator signal input to a local-oscillator-input of a receiver mixer to maintain a quadrature relationship to a phase of the composite-leakage signal input to an antenna-input of the receiver mixer across the operating bandwidth of the altimeter system.

Example 10 includes the method of Example 9, further including tuning an input impedance of an antenna to shift antenna-return-loss amplitude nulls and their associated phase non-linearities outside of the operating bandwidth of the altimeter system.

Example 11 includes the method of any of Examples 9-10, wherein the composite-leakage signal is a coherent superposition of an antenna-reflection-leakage signal and a circulator-leakage signal at the antenna input of the receiver mixer, and wherein shifting composite-leakage-amplitude nulls comprises selecting the selected length of a transmission line to ensure that 180 degree phase differences between the antenna-reflection-leakage signal and the circulator-leakage signal occur at frequencies outside of the operating bandwidth of the altimeter system.

Example 12 includes the method of any of Examples 9-11, further including generating a transmitter signal having a linear ramp in frequency over the operating bandwidth of the altimeter system at a transmitter.

Example 13 includes the method of any of Examples 9-12, further including outputting an intermediate frequency (IF) signal from the receiver mixer; and inputting the IF signal at a receiver intermediate frequency module.

Example 14 includes the method of Example 13, further including determining a distance of less than 4 feet between a target and the altimeter system based on the inputting of the IF signal.

Example 15 includes a method to reduce self-interference in a single antenna frequency modulated continuous wave (FMCW) radar altimeter, the method including controlling a phase response of a composite-leakage signal input to an antenna-input of a receiver mixer to be linear across a sweep bandwidth; and adjusting a phase response of a local oscillator signal input to a local-oscillator-input of the receiver mixer so that the phase response of the local oscillator signal input at the local-oscillator-input of the receiver mixer maintains a quadrature relationship to the phase response of the composite-leakage signal input at the antenna-input of the receiver mixer across the sweep bandwidth.

Example 16 includes the method of Example 15, wherein the radar altimeter includes a circulator and an antenna communicatively coupled by a transmission line having a selected length, wherein controlling the phase of the composite-leakage signal input to the antenna-input of the receiver mixer includes selecting the selected length of the transmission line.

Example 17 includes the method of Example 16, wherein the composite-leakage signal is a coherent superposition of an antenna-reflection-leakage signal and a circulator-leakage signal at the antenna input of the receiver mixer, and wherein selecting the selected length of the transmission line includes selecting the length of the transmission line to ensure that 180 degree phase differences between the antenna-reflection-leakage signal and the circulator-leakage signal occur at frequencies outside of the sweep bandwidth.

Example 18 includes the method of any of Examples 15-17, wherein controlling the phase of the antenna-reflection-leakage signal across the sweep bandwidth includes generating a transmitter signal having a linear ramp in frequency over the sweep bandwidth at a transmitter.

Example 19 includes the method of any of Examples 15-18, wherein adjusting the phase response of a local oscillator signal input at a local-oscillator-input of the receiver mixer comprises maintaining a 90 degree or a 270 degree angular phase relationship between the phase of the composite-leakage signal input at the antenna-input and the phase of the local-oscillator-input of the receiver mixer across the sweep bandwidth.

Example 20 includes the method of any of Examples 15-19, further including: outputting an intermediate frequency (IF) signal from the receiver mixer; inputting the IF signal at a receiver intermediate frequency module; and determining a distance of less than 4 feet to a target from the altimeter system based on the inputting of the IF signal.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. An altimeter system, comprising:
a receiver mixer including an antenna-input and a local-oscillator-input;
a transceiver circulator communicatively coupled to an antenna via a transmission line having a selected length and communicatively coupled to the antenna-input of the receiver mixer;
a transmitter configured to output a transmitter signal to the antenna via the transceiver circulator, wherein the transmitter signal is frequency modulated with a linear ramp; and
a local oscillator delay line configured to input the transmitter signal from the transmitter and to output a local oscillator signal derived from the transmitter signal to the local-oscillator-input of the receiver mixer,
wherein the transmitter is communicatively coupled to the receiver mixer to input the local oscillator signal at the local-oscillator-input of the receiver mixer,
wherein the receiver mixer is communicatively coupled to input a target-reflected signal from the antenna at the antenna-input of the receiver mixer,
wherein the target-reflected signal is reflected from a target to the antenna, and
wherein the selected length of the transmission line is set so that a composite-leakage signal at the antenna-input of the receiver mixer has a linear phase across a sweep frequency range and composite-leakage-amplitude nulls are outside an operating bandwidth of the altimeter system, wherein the composite-leakage signal is a coherent superposition of an antenna-reflection-leakage signal and a circulator-leakage signal at the antenna input of receiver mixer,
wherein an input impedance of the antenna is tuned so: an amplitude response of an antenna-return signal reflected from the antenna is relatively flat a phase response of the composite leakage signal input at the antenna-input of the receiver mixer is linear across the sweep-frequency range of the altimeter system; and an output voltage of a receiver mixer is a direct current (DC) voltage with reduced alternating current (AC) voltage across the operating bandwidth; and
wherein a phase of the local oscillator signal input to the local-oscillator-input of the receiver mixer is adjusted by adjusting a phase length of a local oscillator (LO) delay line to maintain a quadrature relationship to a phase of the composite-leakage signal input to the antenna-input of the receiver mixer across the operating bandwidth.

2. The altimeter system of claim 1, wherein an antenna-reflection-leakage signal of the transmitter signal is reflected by the antenna to the antenna-input of the receiver mixer via the transceiver circulator,
wherein the circulator-leakage signal of the transmitter signal is transmitted from the transmitter via the transceiver circulator to the antenna-input of the receiver mixer, and
wherein, based on the selected length of the transmission line, 180 degree phase differences between the antenna-reflection-leakage signal and the circulator-leakage signal occur at frequencies outside of the sweep frequency range.

3. The altimeter system of claim 1, further comprising the antenna, wherein the antenna is configured to transmit the transmitter signal toward the target and configured to receive the target-reflected signal.

4. The altimeter system of claim 1, further comprising a receiver intermediate frequency module communicatively coupled to input an intermediate frequency (IF) signal output from the receiver mixer.

* * * * *